United States Patent [19]
Priegnitz

[11] Patent Number: 6,069,802
[45] Date of Patent: May 30, 2000

[54] TRANSFORMER ISOLATED DRIVER AND ISOLATED FORWARD CONVERTER

[76] Inventor: Robert A. Priegnitz, 323 Circle Dr., Algonquin, Ill. 60102

[21] Appl. No.: 09/127,144

[22] Filed: Jul. 31, 1998

[51] Int. Cl.[7] ............................. H02M 3/335; H02M 3/24
[52] U.S. Cl. ................................. 363/21; 363/97; 323/907
[58] Field of Search ..................... 363/21, 20, 97, 363/41, 131, 95; 323/907

[56] References Cited

U.S. PATENT DOCUMENTS

| | | |
|---|---|---|
| 4,441,146 | 4/1984 | Vinciarelli . |
| 4,618,919 | 10/1986 | Martin, Jr. . |
| 4,959,764 | 9/1990 | Bassett . |
| 5,126,931 | 6/1992 | Jitaru . |
| 5,231,563 | 7/1993 | Jitaru . |
| 5,434,768 | 7/1995 | Jitaru et al. . |
| 5,459,652 | 10/1995 | Faulk ........................................ 363/49 |
| 5,638,262 | 6/1997 | Brown ...................................... 363/21 |

*Primary Examiner*—Peter S. Wong
*Assistant Examiner*—Rajnikant B. Patel
*Attorney, Agent, or Firm*—Hill & Simpson

[57] ABSTRACT

A DC-DC converter has a main forward converter stage with a snubber at a source side and a sample and hold circuit at a load side. Feedback is provided by a pulse width modulated controller connected at the load side, which feeds an isolation transformer via a differentiating capacitor. The isolation transformer has its output connected to a pulse regenerator which feeds a driver and a volt-time limiter that connects to a main switch at the source side of the forward converter.

9 Claims, 5 Drawing Sheets

"OUT" TERMINAL FROM U1

DIFFERENTIATED PULSE ACROSS T2

RECOVERED PULSE ACROSS Ci

VOLTAGE ON GATE OF O1

VOLTAGE ON DRAIN OF O1

VOLTAGE ON GATE OF O3

TRANSFORMER ISOLATED DRIVER AND ISOLATED FORWARD CONVERTER

BACKGROUND OF THE INVENTION

1. Field of the Invention

The present invention relates generally to a isolated forward mode DC-DC converter.

2. Description of the Related Art

DC to DC converters are known which use primary and secondary control methods. Primary control methods use opto couplers to provide isolation between the input and the output though an analog control path. Secondary control methods typically use isolated drive transformers. A DC blocking capacitor is typically used in series with the driver transformer in such converters to prevent saturation. Since for a wide range converter, the duty cycle can vary from three or four to one, the drive voltage from the transformer can also vary in amplitude by that amount. This is due to the DC blocking capacitor. At high duty cycles, there may not be enough drive voltage, while at low duty cycles, there may be too much. Also, the transformer size is determined by the actual switching frequency.

SUMMARY OF THE INVENTION

The present invention provides a high efficiency isolated forward mode DC-DC converter. Isolation is achieved digitally through a drive circuit as opposed to the known analog approach through a control loop. This eliminates the need for use of opto-isolators, which are less reliable and more difficult to maintain within design margins over component lot variations as well as being subject to temperature variations. The AC characteristics of opto-electronic isolators also result in a slow control response.

The present invention provides transformer isolation and removes some of the objectionable features of transformer coupling. To minimize component size, the converter is designed for a greater than 50% duty cycle operation.

The present embodiment uses transformer isolation with a series connected capacitor. However the capacitor of the present invention is very small, for example, less than 1 nanofarad, and actually serves to differentiate the drive signal. This means that a pulse is generated only on the leading and trailing edges of the drive waveform. This differentiated pulse is typically only 50 to 100 nanoseconds wide, so a very small transformer can be used. The present circuit reconstructs the differentiated signal on the other side of the isolation transformer with a very simple diode-transistor network. Constant amplitude drive signals from less than 5% duty cycles to greater than 90% duty cycles are provided. The transformer can be made very small, even for low switching frequencies.

Also provided by the present invention is a simple voltage-time limiting circuit implemented with the isolated driver. Since the converter can operate over a wide range of duty cycles, a transient load step can cause a demand for a high duty cycle when operating at high input voltages. This could cause the forward converter transformer to saturate, causing catastrophic failure of the main switching transistor. The voltage-time limiter prevents this by limiting the maximum duty cycle as a function of input voltage.

The present invention also provides a method of obtaining synchronous rectification. The synchronous rectifiers are self-driven by the main converter secondary windings. A problem with earlier designs comes when using passive snubber schemes. To optimize the snubber at low input voltage, the snubber capacitor is kept relatively small, for example, less than 10 nanofarads. When the line voltage increases, a point is reached during the off time of a switching transistor when the voltage across the forward converter transformer goes to zero volts. This will remove the drive voltage from a freewheeling synchronous FET, turning it off. This forces the filter inductor current through the body diode (or a parallel Schottky diode), reducing efficiency. An approach that overcomes this limitation is described.

DETAILED DESCRIPTION OF THE PREFERRED EMBODIMENTS

Figure 5:
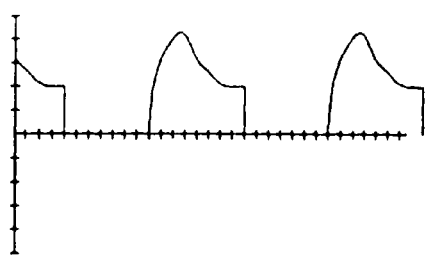
Figure 7:
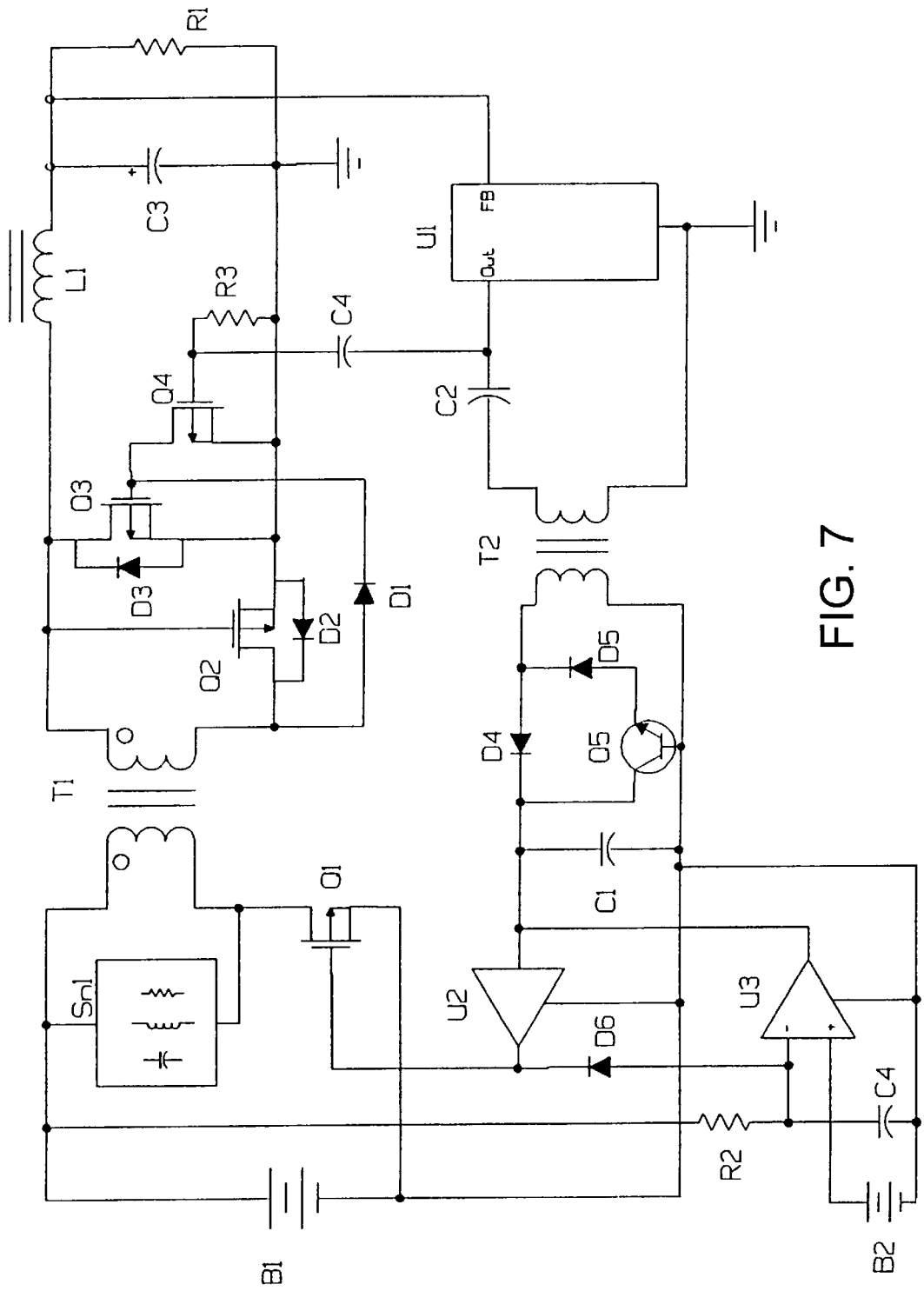
FIG. 7 is a circuit diagram of the transformer and converter according to the principles of the present invention.

Referring to the circuit diagram of FIG. 7, the transformer driver and forward converter of the present invention includes a transistor Q1, a transformer T1, diodes, or rectifiers, D2 and D3, an inductor L1 and a capacitor C3 (ignoring the transistors Q2 and Q3 for the moment) which form a forward converter power stage. The transistor Q1 is the main power switch. During the transistor Q1 on time, a battery or other DC voltage source B1 is connected across the primary of the transformer T1. The battery voltage is modified by the turns ratio of the transformer T1, applied to the secondary rectifiers D2 and D3, and filtered by averaging filter network made up of the inductor L1 and the capacitor C3. The averaged voltage appears across a load resistor R1. During the on time of the transistor Q1, the diode D2 is conducting and the diode D3 is off. When the transistor Q1 turns off, the voltage on the drain rises at a rate determined by a passive snubber network Sn1. The peak drain voltage is determined by the inductances (magnetizing and leakage inductances) of the transformer T1, and the snubber capacitance in the circuit Sn1. When the drain voltage exceeds the voltage of the battery B1, the diode D2 turns off, and the current through the inductor L1 flows through the diode D3. During the off period of the transistor Q1, the voltage across the drain of the transistor Q1 resonantly rises to a peak value, and then falls toward the voltage on the battery B1 (see the graph of FIG. 5). At low input voltages, the drain voltage typically will be greater than the battery B1 voltage when the transistor Q1 turns back on. At higher input voltages, as determined by the value of the snubber capacitance of the circuit Sn1, the drain voltage settles to the battery B1 voltage level before the transistor Q1 turns back on. This means that the voltage across the transformer T1 goes to zero during part of the off period.

The transistors Q2 and Q3 and the shunt diodes D2 and D3 operate as follows: (In fact, D2 and D3 are part of Q2 and Q3.) The transistor Q2 is turned on when the diode D2 is conducting to reduce the conduction losses caused by the diode D2, and the transistor Q3 is turned on when the diode D3 is conducting to reduce the conduction losses caused by the diode D3. The process is as follows.

Figure 6:
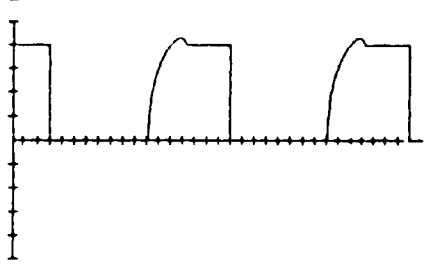

When the transistor Q1 turns on, the diode D2 conducts as previously described. There is a positive voltage from the gate to the source on the transistor Q2. This turns on the transistor Q2 to shunt the diode D2. If the transistor Q2 has a lower forward voltage drop than the diode D2, then most of the inductor L1 current flows through the transistor Q2, and losses are reduced. During the on interval of the transistor Q1, there is no gate voltage applied to the gate of the transistor Q3, and so the transistor Q3 is off. When the transistor Q1 turns off, the voltage on the drain rises as previously described (see FIG. 5). When the drain voltage reaches the voltage of the battery B1, there is no voltage across the transformer T1, and therefore no gate voltage on the transistor Q2. This turns off the transistor Q2, and the diode D3 begins to conduct. As the transistor Q1 drain voltage continues to rise, it becomes greater than the voltage of the battery B1, and the secondary voltage of the transformer T1 reverses. The secondary voltage now turns on the diode D1, which charges the gate capacitance of the transistor Q3 (see the voltage diagram of FIG. 6), and the transistor Q3 turns on, shunting the diode D3. If the transistor Q3 has a lower forward voltage drop than the diode D3, then most of the inductor L1 current flows through the transistor Q3, and losses are reduced. If the secondary voltage on the transformer T1 goes to zero (as described previously), the diode D1 is reverse biased, and the transistor Q3 is held in an on state by its gate charge. Just prior to the transistor Q1 turning on, a controller U1 turns on the transistor Q4, and the transistor Q3 gate voltage is driven to zero, turning off the transistor Q3. The transistor Q1 is then turned on and the cycle repeats.

Figure 1:
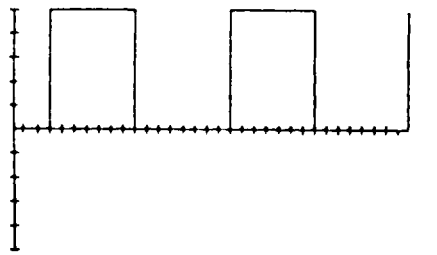
FIGS. 1 through 6 are graphs of voltages occurring in the present circuit.

The controller U1 provides a pulse width modulated rectangular pulse at the "Out" terminal (see the voltage graph of FIG. 1). The voltage at the controllers "FB" terminal determines the pulse width. The controller U1 can be a voltage mode or current mode controller. The pulse output is coupled through the capacitor C4 to the gate of the transistor Q4. The rising edge of the pulse from the "Out" terminal of the controller U1 is coupled through the capacitor C4 to the gate of the transistor Q4, turning it on. This turns off the transistor Q3. The differentiated pulse width at the gate of the transistor Q4 is determined by the resistor-capacitor R3-C4 time constant, and is sufficient to insure that the transistor Q3 is off.

Figure 2:
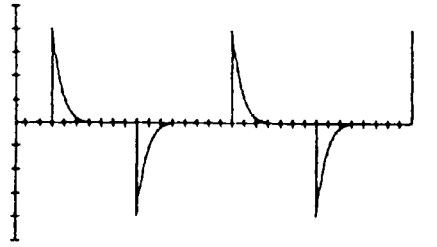
Figure 3:
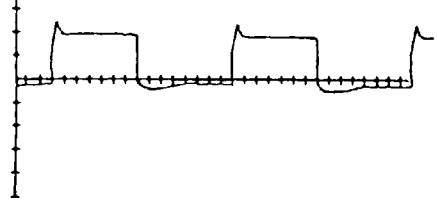

The "Out" pulse of the controller is also coupled through the capacitor C2 to the isolation transformer T2. The capacitor C2 differentiates the pulse to provide a positive pulse at the rising edge, and a negative pulse at the falling edge. These differentiated pulses are typically 50 to 100 nanoseconds in width (as illustrated in FIG. 2). The rising edge pulse is coupled through the transformer T2 and directed by the diode D4 to charge the capacitor C1. The falling edge pulse is coupled through the transformer T1, the diode D5, and the B-E (base-emitter) junction of the transistor Q5. The signal at the base of the transistor Q5 turns on the transistor Q5, and discharges the capacitor C1. The discharging and recharging of the capacitor C1 reconstructs the pulse from the controller U1 after the isolation barrier (see FIG. 3).

Figure 4:
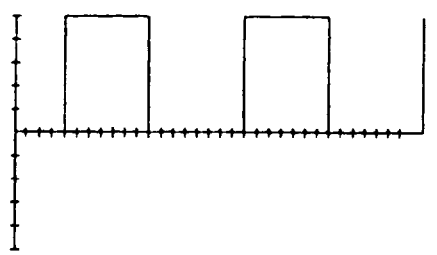

The voltage across the capacitor C1 is buffered and delayed by a driver U2. The amount of delay in the driver U2 is typically 100 nanoseconds, but is set by the amount of time needed to insure that the transistor Q3 is off before the transistor Q1 turns on. The output from the driver U2 drives the transistor Q1 (see FIG. 4).

The voltage-time limiter works by comparing a voltage across a timing capacitor C4 to a reference voltage of the battery B2. If the voltage across the capacitor C4 exceeds the battery B2 voltage, then the comparator discharges the capacitor C1, and the transistor Q1 is turned off. The capacitor C4 is held to zero through the diode D6 when the transistor Q1 is off. (The output from the driver U2 is zero). When the output from the driver U2 goes high, the transistor Q1 turns on, and the diode D6 is reverse biased. This allows the capacitor C4 to begin charging through the resistor R2. If the voltage across the capacitor C4 reaches the voltage of the battery B2 before the PWM (pulse width modulator) controller U1 has commanded an off cycle through the transformer T2, the controller U3 discharges the capacitor C1, and turns off the transistor Q1. As the input voltage at the battery B1 increases, the time it takes to charge the capacitor C4 to the battery B2 voltage decreases, and the maximum on-time of the transistor Q1 is reduced. This effectively limits the maximum duty cycle of the transistor Q1 as a function of the input voltage. The resistor-capacitor time constant R2-C4 is set high enough so it does not interfere with the controller U1 control during normal operation, but will protect the transformer T1 from saturation during transient conditions.

Figure 8:
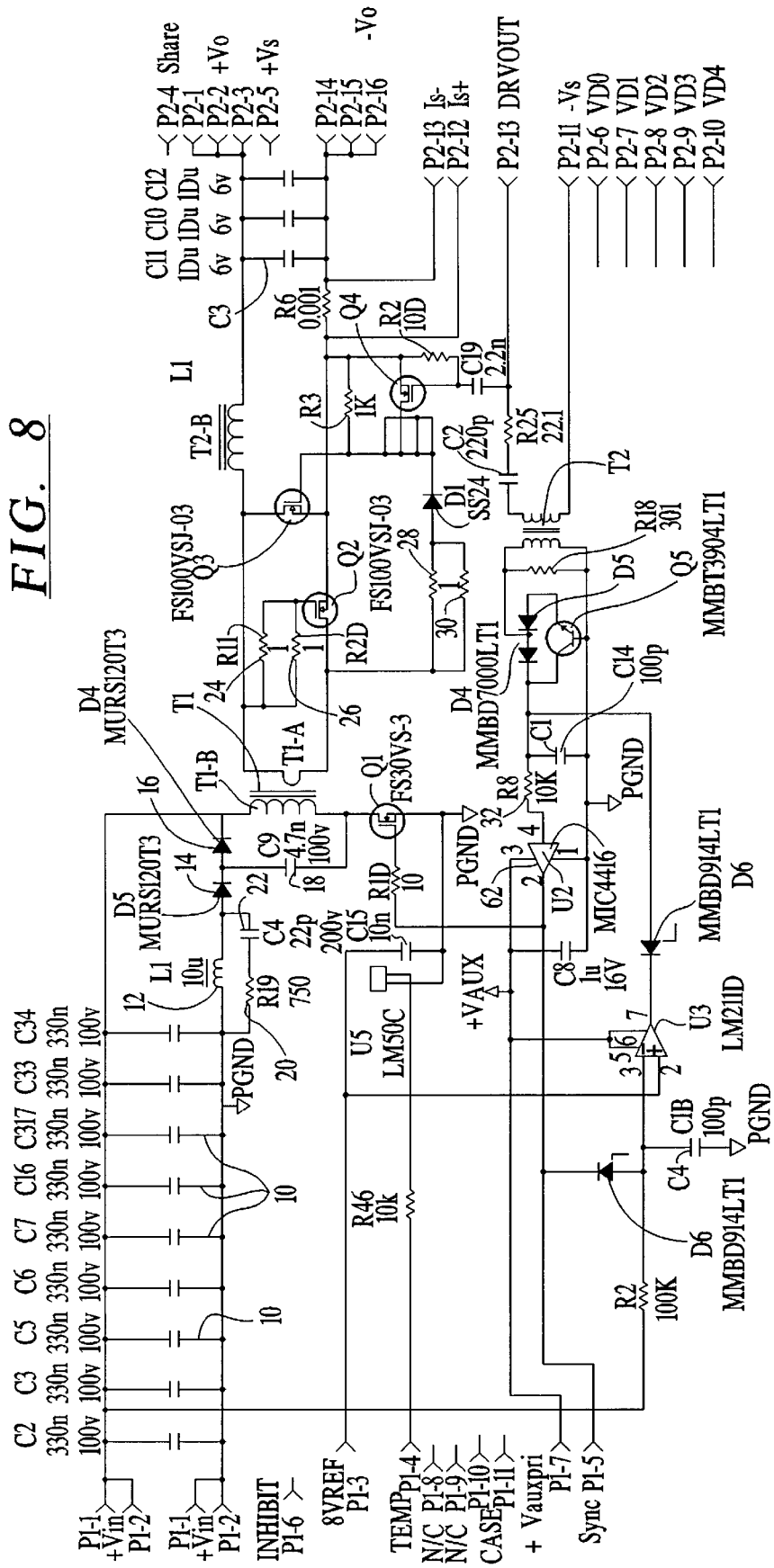
FIG. 8 is a circuit diagram of an example of a variation on the transformer and converter circuit.

FIG. 8 illustrates a preferred embodiment of the circuit of FIG. 7, wherein a plurality of parallel connected capacitors 10 are connected as filters at a source side of the forward converter. The snubber circuit Sn1 is shown as in including an inductor 12, diodes 14 and 16 and a capacitor 18. A resistor 20 and capacitor 22 for additional EMI filtering are also provided.

Noise control is provided at the load side of the main transformer T1 by resistors 24 and 26 connected to the transistor Q2. Additional noise suppression is provided by resistors 28 and 30. A delay is added by a resistor 32 connected between the pulse regenerator and the driver U2.

Figure 9:
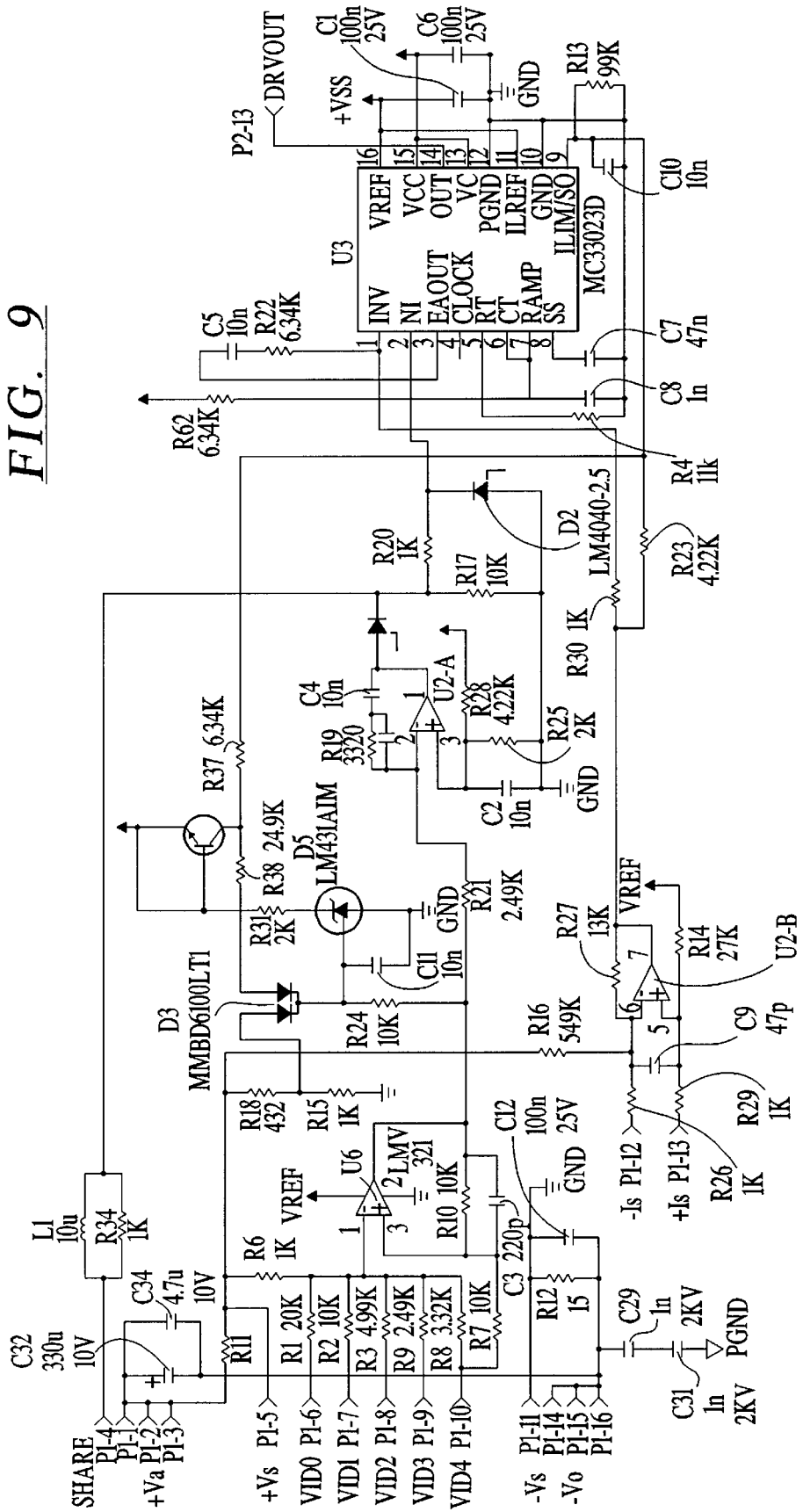
FIG. 9 is a circuit diagram of one embodiment of a controller for use in the circuit of FIG. 7.
Figure 10:
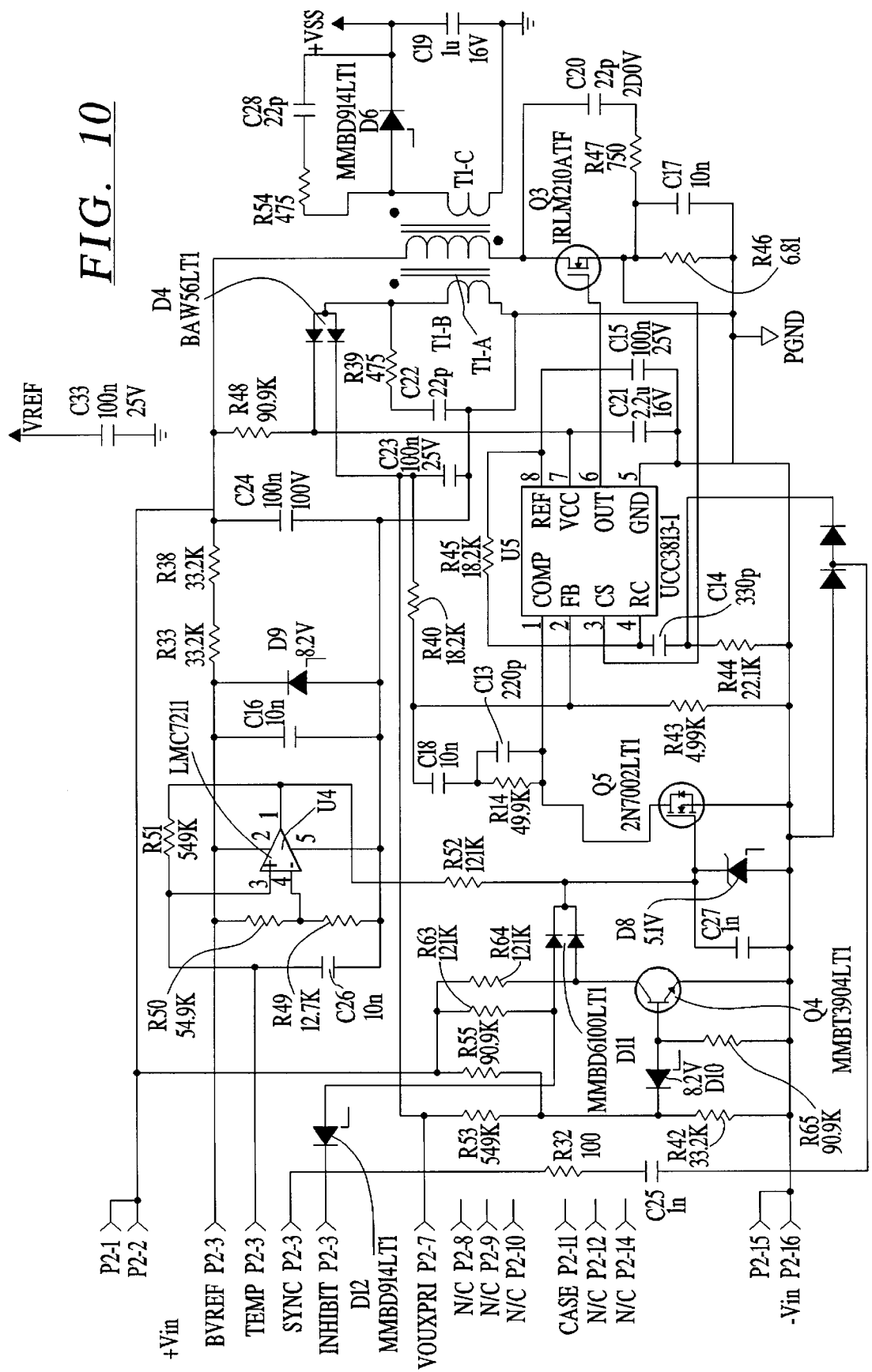
FIG. 10 is a circuit diagram of an auxiliary supply according to the present invention.

The control section represented by the controller U1 includes a current mode PWM section and an over-voltage latch, as shown in FIG. 9, and an auxiliary power supply, as shown in FIG. 10.

The auxiliary supply is a flyback converter consisting of pwm controller U5, the transformer T1, and the transistor Q3. This supply provides 12 volts at approximately 25 mA to both the primary drive stage, and to the secondary control stage. A transistors Q4 is an under-voltage detector, which holds a transistor Q5 on when the input voltage is below approximately 34 volts, and therefore prevents controller U5 from operating. Above 34 volts, the supply can be on, depending on the state of the inhibit signal at the cathode of a diode D12, and the state of over-temperature detection comparator U4.

The PWM controller U3 uses a UC3823 (or MC33023) controller IC as the heart of a secondary side average current mode control system. Its output is a pulse width modulated signal at approximately 300 kHz which drives both the isolated driver stage and the synchronous rectifier control switch Q4. The input to the controller U3 includes a current signal at pin 1 and a voltage error signal at pin 2. The current signal is derived by amplifying the voltage across current sense resistor R6 (in the power stage) by about 13 in gain stage of an amplifier U2B (which is preferably a wide bandwith operational amplifier), and adding a DC offset voltage developed from the reference of the controller U3 (pin 16), through a resistor R14. The voltage error signal (from op-amp U2A) is obtained by sampling the output voltage through divider stage of U6, and comparing it to a 2 volt reference developed across a resistor R25. Clamp diode D2 limits the voltage error signal amplitude to 2.5 volts to limit the maximum output current.

This control also allows for current sharing. The share point is the cathode of the diode D1. In multiple paralleled converters, one error amplifier will control the voltage at the cathode of the diode D1 in all converters through the share line. Since the converter current is forced to follow this error voltage, all converters see the same error voltage, and therefore are forced to have the same output current.

A diode D5 and a level translator Q2 form a latching over-voltage comparator. When an over-voltage condition is detected by the diode D5, the transister Q2 turns on, and drives current through the resistor R37, which turns off the controller U3. With the controller U3 off, there is no output from the converter.

Thus, the present invention provides synchronous rectification and control in a converter circuit with reduced variation due to manufacturing tolerances and temperature/performance characteristics of components.

Although other modifications and changes may be suggested by those skilled in the art, it is the intention of the inventor to embody within the patent warranted hereon all changes and modifications as reasonably and properly come within the scope of his contribution to the art.

I claim:

1. A DC-DC driver circuit, comprising:
   an isolation transformer having input and output windings;
   a differentiating capacitor connected in series at the input winding of said isolation transformer, and
   a pulse regenerator connected across the output winding of said isolation transformer, said pulse regenerator including:
      a transistor having a base connected at a first lead of said output winding,
      a first rectifier connected between a second lead of said output winding and an emitter of said transistor,
      a capacitor connected between said base of said transistor and a collector of said transistor, and
      a second rectifier connected between said collector and said emitter of said transistor.

2. A DC-DC driver circuit as claimed in claim 1, further comprising:
   a supply voltage;
   a comparator having first and second inputs and an output connected to said collector of said transistor;
   a resistor connected between said first input of said comparator and the supply voltage;
   a capacitor having a first lead connected to said first input and having a second lead; and
   a voltage source connected between said second lead of said capacitor and said second input of said comparator.

3. A power converter, comprising:
   a converter having a source side and a load side;
   a power switch connected to said input side;
   a pulse width modulated controller having an input connected to said load side and an output;
   an isolated driver between said pulse-width modulated controller and said power switch, said isolated driver including:
      a differentiating network to convert a rectangular pulse from said pulse width modulated controller to a series of differentiated pulses, said differentiated pulses being exponentially decaying positive and negative pulses coincident respectively with rising and falling edges of the rectangular pulse;
      an isolation transformer connected to said differentiating network; and
      a pulse regenerator connected between said isolation transformer and said power switch which reconstructs the differentiated pulses into a reconstructed rectangular pulse to drive said power switch.

4. A power converter as claimed in claim 3, further comprising:
   a volt-time limiter connected to said pulse regenerator and said source side of said converter.

5. A power converter comprising:
   a forward converter having a source side and a load side;
   a feedback loop connected between said source side and said load side, said feedback loop including:
      a pulse width modulated controller having an input connected to said load side and an output;
      an isolation transformer having a first winding connected to said output of said pulse width modulated controller and having a second winding;
      a pulse regenerator connected to said second winding of said isolation transformer, an output of said pulse regenerator connected to said source side of said forward converter, and
   a differentiating capacitor connected between said pulse width modulated controller and said isolation transformer.

6. A power converter comprising:
   a forward converter having a source side and a load side;
   a feedback loop connected between said source side and said load side, said feedback loop including:
      a pulse width modulated controller having an input connected to said load side and an output;
      an isolation transformer having a first winding connected to said output of said pulse width modulated controller and having a second winding;
      a pulse regenerator connected to said second winding of said isolation transformer, an output of said pulse regenerator connected to said source side of said forward converter; and
   a snubber connected at an input of said forward converter.

7. A power converter, comprising:
   a forward converter having a source side and a load side, said forward converter including
      a synchronous rectification circuit at said load side;
   a feedback loop connected between said source side and said load side, said feedback loop including:
      a pulse width modulated controller having an input connected to said load side and an output;
      an isolation transformer having a first winding connected to said output of said pulse width modulated controller and having a second winding;
      a pulse regenerator connected to said second winding of said isolation transformer, an output of said pulse regenerator connected to said source side of said forward converter, and
   a sample and hold circuit connected to control said synchronous rectification circuit, a control input of said sample and hold circuit being connected to an output of said pulse width modulated controller.

8. A power converter, comprising:

a forward converter having a source side and a load side;

a feedback loop connected between said source side and said load side, said feedback loop including:
- a pulse width modulated controller having an input connected to said load side and an output;
- an isolation transformer having a first winding connected to said output of said pulse width modulated controller and having a second winding; and
- a pulse regenerator connected to said second winding of said isolation transformer, an output of said pulse regenerator connected to said source side of said forward converter, said pulse regenerator including:
  - a transistor having a base connected at a first lead of said output winding,
  - a first rectifier connected between a second lead of said output winding and an emitter of said transistor,
  - a capacitor connected between said base of said transistor and a collector of said transistor, and
  - a second rectifier connected between said collector and said emitter of said transistor.

9. A power converter, comprising:

a forward converter having a source side and a load side, said forward converter including a main switch at the source side;

a feedback loop connected between said source side and said load side, said feedback loop including:
- a pulse width modulated controller having an input connected to said load side and an output;
- an isolation transformer having a first winding connected to said output of said pulse width modulated controller and having a second winding;
- a pulse regenerator connected to said second winding of said isolation transformer, an output of said pulse regenerator connected to said source side of said forward converter, and a driver having an input connected at an output of said pulse regenerator and an output connected to drive said main switch.

* * * * *